(12) United States Patent
Bishop et al.

(10) Patent No.: US 7,403,887 B1
(45) Date of Patent: Jul. 22, 2008

(54) EMULATED MEMORY MANAGEMENT

(75) Inventors: Alan G. Bishop, Campbell, CA (US);
Landon Dyer, Medina, WA (US);
Martin Taillefer, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 449 days.

(21) Appl. No.: 10/759,773

(22) Filed: Jan. 14, 2004

(51) Int. Cl.
*G06F 9/455* (2006.01)
*G06F 12/00* (2006.01)
*G06F 21/00* (2006.01)
*G06F 13/00* (2006.01)
*G06F 9/26* (2006.01)

(52) U.S. Cl. .................. 703/26; 711/1; 711/6; 711/170; 711/203

(58) Field of Classification Search ................ 703/26
See application file for complete search history.

(56) References Cited

U.S. PATENT DOCUMENTS 5,073,968 A * 12/1991 Morrison .................... 703/26
6,510,083 B1 * 1/2003 See et al. ............... 365/185.24

OTHER PUBLICATIONS

Operating System Concepts, Fifth Edition, by Silberschatz and Galvin. Copyright © 1999 by John Wiley and Sons, Inc. Sections 1.5, 3.3.5, 3.6, and 8.2 to 8.6.5.*

* cited by examiner

*Primary Examiner*—Paul L Rodriguez
*Assistant Examiner*—Nithya Janakiraman
(74) *Attorney, Agent, or Firm*—Lee & Hayes, PLLC

(57) ABSTRACT

A first software program executing on a computing device emulates a second computing device executing a software program using emulated memory. The first software program permits the second software program to perform an operation on a contiguous portion of the emulated memory only when a pointer and a table entry both contain the same identifier, thus protecting against common types of memory usage errors in the second software program. The pointer has an address to the contiguous portion. The table entry maps to the contiguous portion. A plurality of table entries map to a respective plurality of contiguous portions of the emulated memory. A plurality of the pointers each contain the address to a respective contiguous portion of the emulated memory as well as containing an identifier corresponding to the respective contiguous portion of the emulated memory. The second computing device can be high or low in resources.

22 Claims, 5 Drawing Sheets

EMULATED MEMORY MANAGEMENT

TECHNICAL FIELD

The present invention relates generally to an environment in which a first apparatus executes a first application to emulate the execution of a second application by a second apparatus, and more particularly to an application running on an emulated platform in an environment in which it is desirable to detect memory errors.

BACKGROUND

The need for low resource computing devices continues to expand in both industry and consumer applications. Examples of such low resource computing devices include a set top box suitable for satellite or cable television reception, a video game console, a Personal Digital Assistant (PDA), a cellular telephone, and a handheld computing device. Developing software that is to be executed on a low resource computing device is best done on a high resource computing device. The robust memory and processing capabilities of the high resource computing device are conveniences available to a developer that can be used to emulate software being developed and debugged to run on the low resource computing device. For instance, the high resource computing device can execute an emulating application that can emulate the operation of a processor executing an application using an operating system in a low resource computing device. As such, the low resource computing device that is to be emulated will typically be a client that has less memory and/or computing resources than that of a computing device that is used to emulate the client executing applications that run on the client.

A typical software bug that occurs in applications developed on any computing device is a memory management bug. Memory management bugs are a key contributor to software instability and increased software development time for computing devices due to the effects of using an obsolete memory pointer in an incorrect access to memory. When an access to memory occurs during the execution of an application, and that access uses an obsolete pointer to memory, the application typically does not stop executing as soon as the incorrect memory access occurs. Rather, the result of this bug is not noticed until long after the incorrect memory access has occurred. As a result, a developer must undertake the often difficult task of finding how and where the bug occurred during execution of the application that performed the access to memory.

A typical example of a memory error occurs when a pointer to a portion of memory is used in a memory management operation after that portion had been previously freed by a prior memory management operation. In this example, the later memory management operation has re-referenced an obsolete memory pointer in an incorrect access to memory without any error being signaled. It would be an advance in the art to signal the occurrence of the incorrect memory access to memory at the time of its occurrence during the execution of emulation code so that the location of the errant code can be can easily identified—thereby increasing the probability of having an easily reproducible test case that can be used in debugging by a software developer.

SUMMARY

In one implementation, a call is made to a memory manager by an application running on an emulated platform. The call is for an emulated memory access operation on emulated memory that has been previously allocated. The call specifies a pointer having an address that points to the allocated emulated memory. An Identifier (ID) has been assigned both to the pointer and to at least one entry in a table. At least one table entry is associated with the address that points to the allocated emulated memory upon which the access operation is to be performed. A comparison is made between the ID in at least one table entry pointer and the pointer. If the IDs do not match, then a diagnostic is output and the emulated memory access operation on the allocated emulated memory is prevented from being performed. The operation for which the memory manager was called is performed when there is a match.

BRIEF DESCRIPTION OF THE DRAWINGS

A more complete understanding of the implementations may be had by reference to the following detailed description when taken in conjunction with the accompanying drawings wherein.

Figure 1:
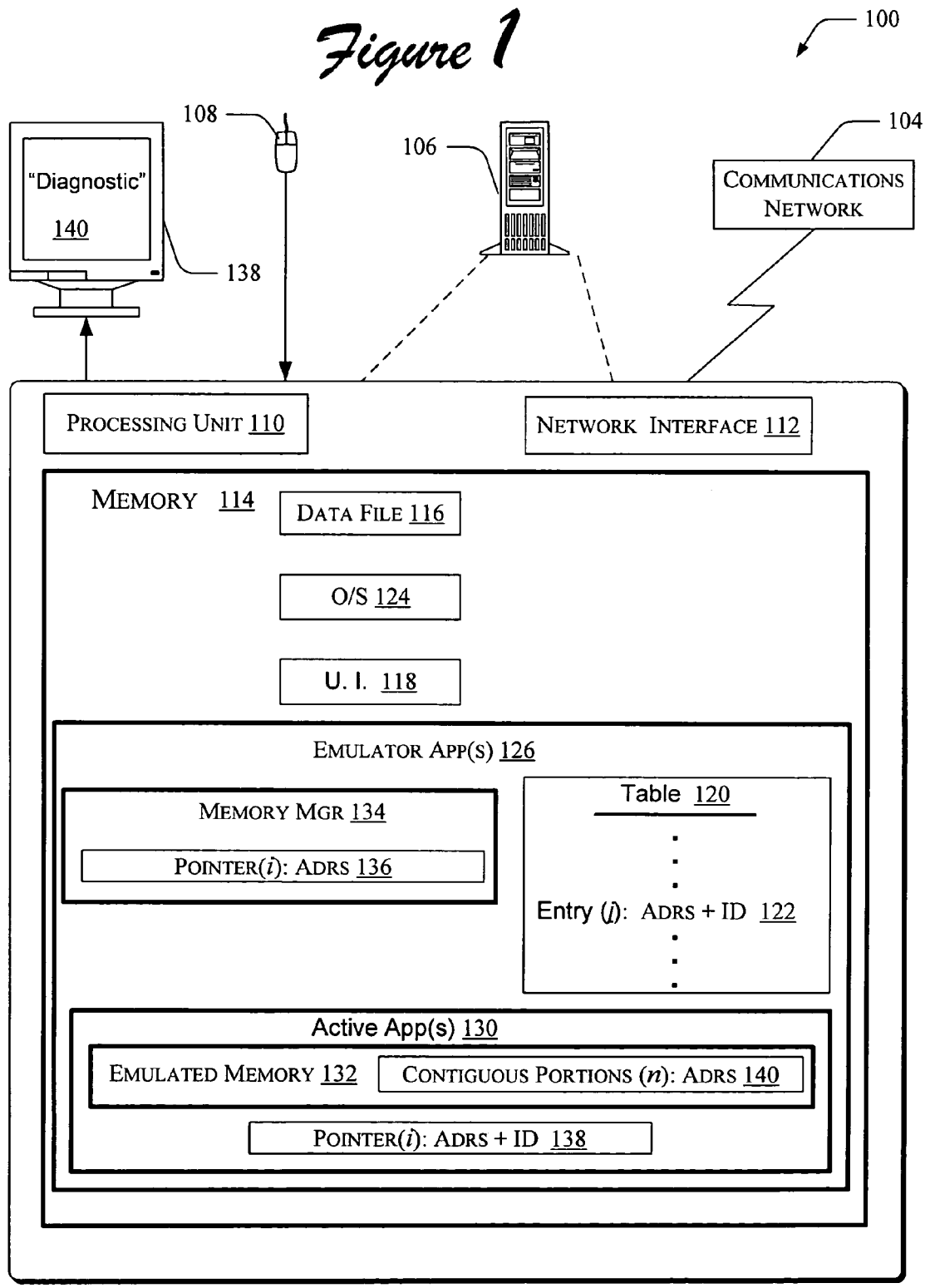
FIG. 1 shows an exemplary environment in which a computing device can execute a software program so as to emulate the operation of a low resource client through the use of emulated memory.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A tool, in various implementations, provides an environment for a system to emulate the operation of a low resource client, including its memory and processor. The tool is useful in the location of memory access errors that occur when a pointer that points to a portion of the emulated memory is used after that portion was previously freed (e.g., the use of a 'stale' pointer). The inventive tool, in one implementation, is an emulator that patches into calls to a memory manager for the emulated memory.

Allocation of Emulated Memory.

When code running in the emulator allocates a heap block of the emulated memory, the emulator assigns an Identifier (ID) or an increasing generation count to that heap block. Stated otherwise, the allocation operation allocates a contiguous portion of emulated memory, where the ID or the generation count is assigned to all addresses within the allocated range of emulated memory. The assigned ID or generation count is entered into one or more entries in a table that maps to the emulated memory. The table can be indexed by the addressing of the emulated memory such that each table entry can correspond to an address in the emulated memory. The ID or the generation count is then copied from a corresponding table entry into unused bits in a pointer that points to an address of the allocated contiguous portion of emulated memory. Thus, each pointer to emulated memory and each table entry in the table contains an ID or a generation count. The pointer can be used by the call to a memory manager to perform an emulated memory access operation.

Emulated Memory Access Operation.

An application being run in the emulator can attempt an emulated memory access operation upon a previously allocated contiguous portion of emulated memory. The emulated memory access operation can be an attempt to read from or write to the previously allocated contiguous portion. It can also be an attempt to reallocate or to free the previously allocated contiguous portion. When the emulated memory access operation is attempted, the ID or generation count stored in the pointer containing the address of the contiguous portion is compared to the ID or generation count stored in the table entry corresponding to the address of the contiguous portion. If these two generation counts match, the emulated memory access operation continues as if the generation count was not present in the memory pointer. Otherwise, an error is signaled.

Memory Errors.

When an error is signaled, a developer can debug the incorrect access to emulated memory by the code of the application running in the emulator. Such an error can be signaled, for instance, when a stale or obsolete pointer is used in the code after a corresponding previously allocated contiguous portion of the emulated memory being referred to had been freed. By associating an ID or a generation count to a previously allocated contiguous portion of the emulated memory via a respective entry in a mapping table as well as in the pointer to that contains address to the contiguous portion, the error can be signaled upon the use of the stale or obsolete pointer.

FIG. 1 shows an environment 100 in which a computing device can execute a first software program so as to emulate the operation of a low resource client through the use of emulated memory. FIG. 1 shows the computing device at reference numeral 102, the first software program as being one or more emulator applications (Apps) 126. Computing device 102 is in communication via a network interface 112 to a communications network 104. A user input device, such as a mouse 108, provides input to software executing in hardware that is located in a tower or case 106.

Case 106 includes a processing unit 110 and memory 114. Memory 114 includes one more data files 116, one or more user interface (U.I.) applications 118, an operating system (O/S) 124, and one or more emulator applications 126. Each emulator application 126 includes a table 120 having entries (1-N) 122, and includes one or more active application 130. Each active application 130, which is executed by emulator app 126, emulates its running on an emulated platform. Implementations enable the finding of memory errors as they occur in the environment of the emulated platform. As such, the active application 130 runs within the emulator application 126 as if it were running on a device that the emulator application 126 is emulating.

Each active application 130 has an emulated memory 132 and one or more pointers (i) 138. Emulated memory 132 can have one or more previously allocated contiguous portions 140 (n), where n is from 1 to N. Each emulator application 126 also includes a memory manager 134 having one or more other pointers (i) 136. Each pointer (i) 136, 138 contains the address of a previously allocated contiguous portion 140 of emulated memory 132. Each pointer (i) 136 includes unused bits. The pointers (i) 138 contain an ID in one implementation and a generation count in another implementation. The ID or generation count, depending upon the implementation, is stored in each pointer (i) 138 at a location corresponding to the unused bits in a corresponding pointer (i) 136.

The previously allocated contiguous portions (n) 140 of emulated memory 132 can be referenced by an address or a range of addresses. These addresses correspond to multiple entries (j) 122 in the table 120. Each range might have more than one table entry (j) 122. Alternatively, in a different implementation, one (1) single table entry (j) 122 could cover multiple ranges of addresses. Each address or range of addresses for the contiguous portions (n) 140 of emulated memory 132 have a corresponding ID or generation count that is stored in corresponding table entries 122((j) in table 120.

Each table entry (j) 122 corresponds to a contiguous portion (n) 140 of one of more bytes of emulated memory 132, also known as a 'heap'. In one implementation, each table entry (j) 122 refers to the same number of bytes of emulated memory 132. The pointers (i) 136, 138 each contain an address of (i.e., that 'points to') locations in emulated memory 132 (i.e., is addressed within the 'heap'), although not every address in the emulated memory 132 will have a corresponding pointer (i) 136, 138 that points to somewhere in the heap.

The table 120 maps to emulated memory 132 such that the index "n" for contiguous portions 140 can be divided by a fixed number of bytes so as to arrive at the corresponding index 'j' for entries (j) 122 of table 120. Stated otherwise, "n" is a multiple of "j". As such, in one implementation, table 120 is indexed by "j" that corresponds to an address of a corresponding contiguous portion (n) 140 within the emulated memory 132. The index "i" is for pointers (i) 136, 138 that exist for the emulation environment, where the index "i" is not a multiple of either of the indices "j" or "n". The ID or generation count is recorded both in unused address bits of pointer (i) 138 as well as in each of 'n' table entries 122 in a table 120 that correspond to the addresses of previously allocated contiguous portions (n) 140 of emulated memory 132.

Each emulator application 126, when executed by processing unit 110, emulates the execution of an active application 130, such as on a low resource client. Memory manager 134 is called by the active application 130 to access one or more previously allocated contiguous portions (n) 140 of emulated memory 132 by performing an emulated memory access operation. The emulated memory access operation can be an attempt to read from or write to one or more previously allocated contiguous portions (n) 140. Alternatively, the emulated memory access operation can be an attempt to reallocate or to free one or more previously allocated contiguous portions (n) 140.

During an emulated memory access operation by memory manager 134 upon the emulated memory 132, a pointer (i) 136 is used by the active application 130. The pointer (i) 136 contains an address of the previously allocated contiguous portions (n) 144 in emulated memory 132 upon which the operation is to be performed. This address is also contained in the pointer (i) 138 being used by the emulator application 126 to execute the active application 130 as if it were running on the low resource client. Each entry (n) 122 in table 120 contains both an ID or a generation count and an address corresponding to a previously allocated contiguous portion (n) 140 in emulated memory 132.

Given the foregoing, it can be summarized that each pointer (i) 136, 138 to the emulated memory 132 and each table entry (n) 122 in the table 120 contains an ID or a generation count. The code of the active application 130 being run in the corresponding emulator application 126 can use an address or a range of addresses in an attempt to perform an emulated memory access operation upon one or more contiguous portions 140 (*n*) of emulated memory 132. Incident to this attempt, the ID or generation count stored in the corresponding pointer (i) 138 that points to the particular contiguous portion 140 (*n*) of emulated memory 132 will be compared to the ID or generation count that is looked up in the table 120 by using the address or a range of addresses that are stored in corresponding table entries 122. An error is signaled if these two (2) IDs or generation counts do not match. Otherwise, the emulated memory access operation will continue. Within active application 130, in this example, the ID or generation count is not present in the pointer (i) 136.

Figure 2:
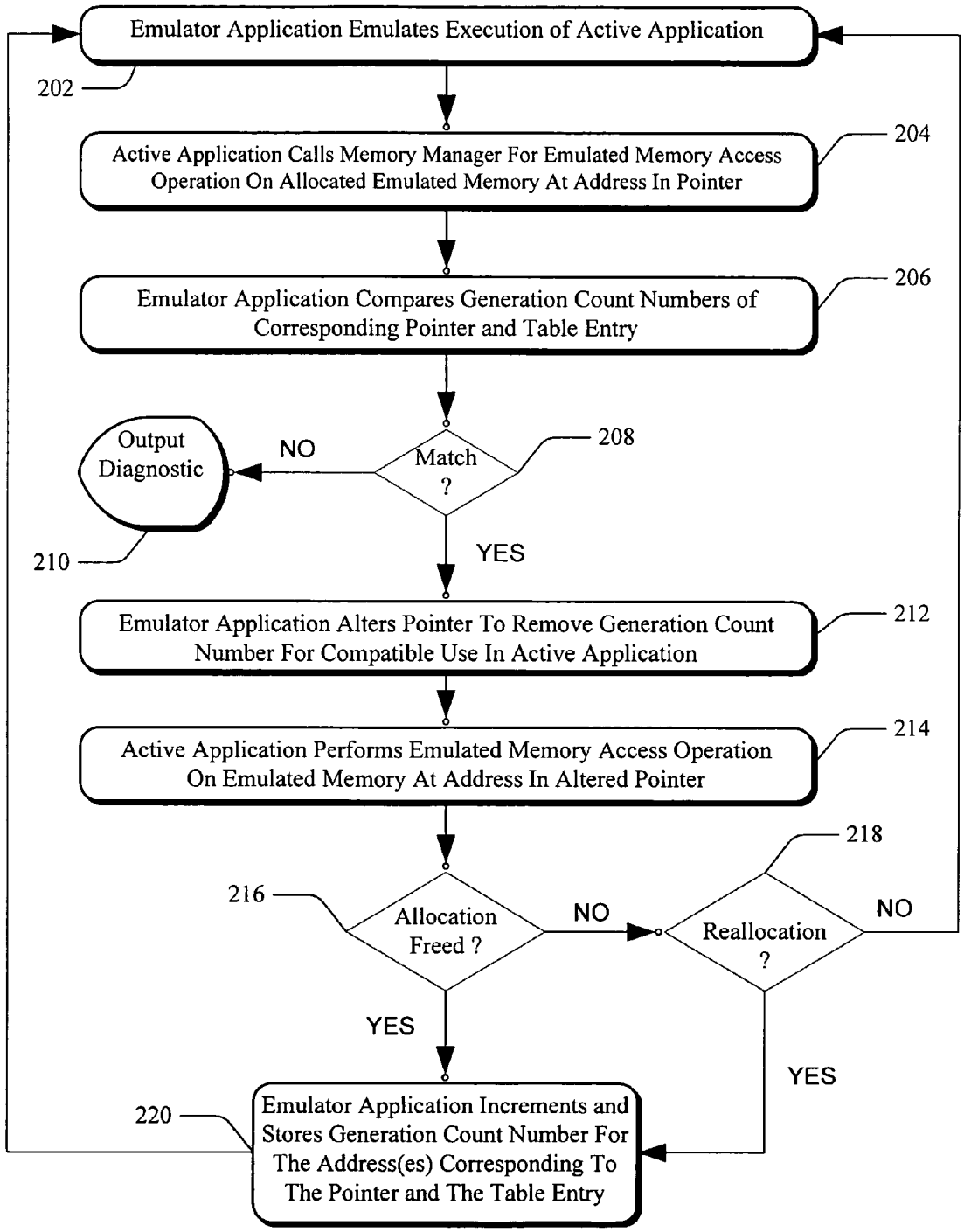
FIG. 2 is a flowchart for an exemplary implementation of a process for emulated memory management.

FIG. 2 depicts a process 200 that can be used in the environment 100 such that emulator application 126 can be executed by processing unit 110 so as to enable access to emulated memory 132 during the execution of active application 130 as if it were running on a client that the emulator application 126 is emulating, for instance, on a low resource client. During the emulation of the client by emulator application 126, memory manager 134 is called by active application 130 to use previously allocated contiguous portions (n) 140 of emulated memory 132 in emulated memory access operations.

Memory Allocation.

Prior to process 200, an allocation operation allocated one or more contiguous portions (n) 140 of emulated memory 132. The allocation operation assigned an ID or generation count to all addresses within the contiguous portions (n) 140 of emulated memory 132. The assigned ID or generation count is entered into one or more entries (j) 122 in the table 120 that maps to the emulated memory 132. The table 120 can be indexed by the index 'j' representing the addresses of emulated memory 132. As such, each table entry (j) 122 can correspond to an address of a contiguous portion (n) 140 of emulated memory 132. As part of the allocation operation, the assigned ID or generation count is copied from a corresponding table entry (j) 122 into unused bits in a pointer (i) 136 to produce pointer (i) 138 that points to an address of the allocated contiguous portion (n) 140 of emulated memory 132. Thus, each pointer (i) 138 to emulated memory 132 and each table entry 0) 122 in the table 120 contains an ID or a generation count. Thereafter, pointer (i) 138 can be used by a call by active application 130 to the memory manager 134 to perform an emulated memory access operation upon the previously allocated contiguous portions (n) 140 in emulated memory 132.

Emulated Memory Access Operations.

Process 200, which follows the foregoing allocation process, includes block 202 where emulator application 126 emulates the execution of active application 130. Incident to this emulation, at block 204, the active application 130 calls the memory manager 134 for an emulated memory access operation on one or more previously allocated contiguous portions (n) 140 of emulated memory 132. The access operation uses the address(es) in pointer (i) 138.

At block 206, the table entry (j) 122 is retrieved from table 120 that corresponds to the address of the one or more previously allocated contiguous portions (n) 140 of emulated memory 132. The emulator application 126 performs a comparison to see if there is match between the ID or generation count that is contained in the pointer (i) 138 and retrieved the table entry 122. When the ID or the generation count is the same, block 208 passes control of process 200 to block 212. Otherwise, a diagnostic is output at block 210. The diagnostic can be descriptive of the circumstances of the error, such as where there has been an attempt by the active application 130 to call the memory manager 134 for a memory access operation to a contiguous portion (n) 140 using an obsolete memory pointer in an incorrect access to emulated memory 132. When such an incorrect emulated memory access is attempted during the execution of active application 130, the execution can be stopped so that a developer can locate and debug the code. As a result, the developer need not undertake the task of finding how and where the bug occurred, should execution of the active application 130 have been permitted to continue beyond the occurrence of the incorrect access. Alternatively, the diagnostic can be descriptive enough to allow debugging even though the active application 130 is permitted to continue execution after the occurrence of the incorrect access to emulated memory.

If a match is found at block 208, in one implementation, the emulator application 126 can be used to alter the pointer (i) 138 at block 212 to remove the ID or generation count. This removal is performed to make the pointer (i) 138 compatible for use as the corresponding pointer (i) 136 in the active application 130. For instance, the pointer (i) 136 may have an unused portion (e.g., one or more free bits) into which the ID or generation count can be inserted for use by the emulator application 126 of the corresponding pointer (i) 138. The unused portion, however, can be restored by replacing the ID or generation count in the pointer (i) 138 with zeroes prior to use of the corresponding pointer (i) 136 by the active application 130.

The address in the altered pointer (i) 136 is used at block 214 by active application 130 to perform the emulated memory access operation on the corresponding previously allocated contiguous portion(s) (n) 140 of emulated memory 132. After the memory access operation at block 214, a query 216 determines if the previously allocated contiguous portion (s) (n) 140 were freed. If so, then process 200 moves to block 220 at which the emulator application 126 stores a new ID or increments and stores the generation count for the address corresponding to the pointer (i) 138 and the table entry (n) 140. After block 220, process 200 returns to block 202.

If the result of query 216 is negative, then a query 218 determines if the emulated memory access operation was a reallocation of the previously allocated contiguous portion(s) (n) 140. If so, the process 200 moves to and repeats block 220. If not, it may be presumed that the emulated memory access operation was a read or a write operation for which no change or increment is made to the ID or generation count. As such, process 200 returns to block 204.

In principal, the ID or generation count can be changed in table 120 whenever an access is made to the emulated memory 132 through a certain pointer (i) 136, 138 so as to change the access from being allowed to being disallowed or vice versa. Such a change does not happen when the emulated memory access operation is merely a read or a write operation. Rather, this change occurs for an allocation and for a reallocation of one or more contiguous portions (n) 140 of emulated memory 132. In another implementation, the change can also occur upon the reallocation or freeing of an allocation of one or more contiguous portions (n) 140 of emulated memory 132.

Figure 3:
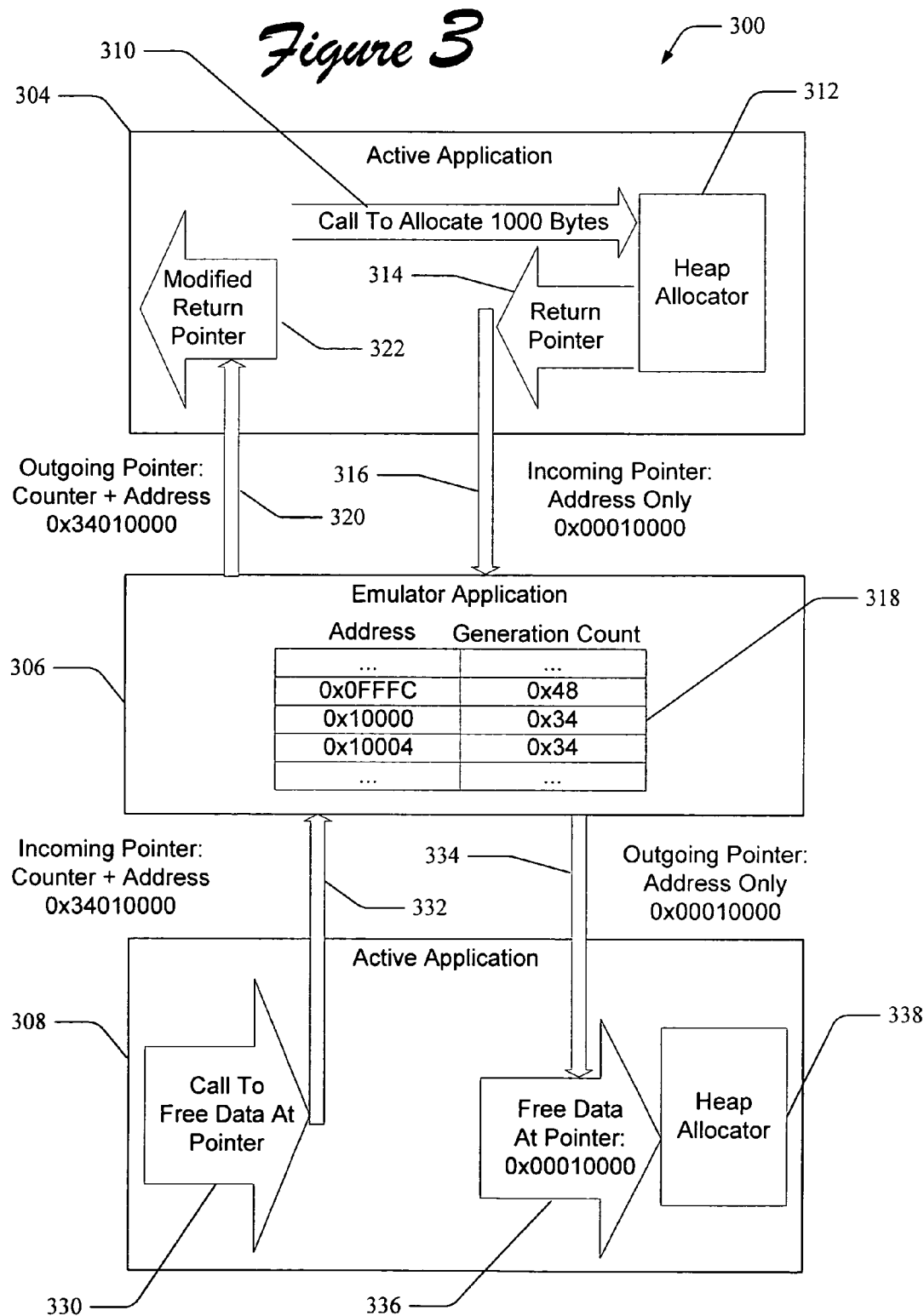
FIG. 3 is a flowchart for an implementation of first and second exemplary processes for emulated memory management for an application running in an emulator that respectively allocates and frees a heap block of emulated memory, where both processes include a comparison between two identifiers for the heap block of emulated memory to prevent an incorrect access to emulated memory.

FIG. 3 depicts another implementation in which an emulated central processing unit (CPU) of a low resource client executes an active application 304. A call 310 is made for a heap allocation of 1000 bytes of emulated memory. Such a call can be made, for example, by a command "ptr=AllocMem(1000)". Call 310 initiates heap allocator module 312 to return a pointer 314. This pointer 314 includes only an address, such as '0x00010000', and is returned via communication 316 to an emulator application 306. A table containing entry 318 is used by the emulator application 306. Table entry 318 contains both the address '0x00010000' and a generation count '0x34'. Here, the allocation of 1000 bytes is represented by a previous generation count of 0x33 that in one implementation could be incremented to 0x34 and then written to 250 of the table entries starting at 0x10000, where each heap block of emulated memory is 4 bytes. Accordingly, FIG. 3 shows that communication 316 passes the incoming pointer containing "0x00010000" that is modified by inserting the generation count 0x34 from table entry 318, after which the pointer is returned to the active application 304 via communication 320.

FIG. 3 depicts yet another implementation where an incoming pointer containing "0x34010000" is passed by an active application 308 via a communication 332 to free the previously allocated heap blocks of 1000 bytes of emulated memory. As explained below, the incoming pointer is verified by the emulator application 306 for correct access to emulated memory and then modified for use by the active application 308. Here, the generation count '0x34' in table entry 318 at address '0x1000' is compared by emulator application 306 with the incoming pointer '0x34010000'. The match at address '0x1000' of the generation count '0x34' in table entry 318 and in the incoming pointer '0x34010000' indicates a correct access to emulated memory. Upon finding the match, the emulator application 306 removes the generation count '0x34' from the incoming pointer for use as the outgoing pointer '0x00010000'. As such, the outgoing pointer contains only the address. The active application 308 can then use the outgoing pointer's address of '0x00010000' via communication 334 to free the 1000 bytes of emulated memory at the address '0x00010000' in the outgoing pointer via heap allocator module 338.

Figure 4:
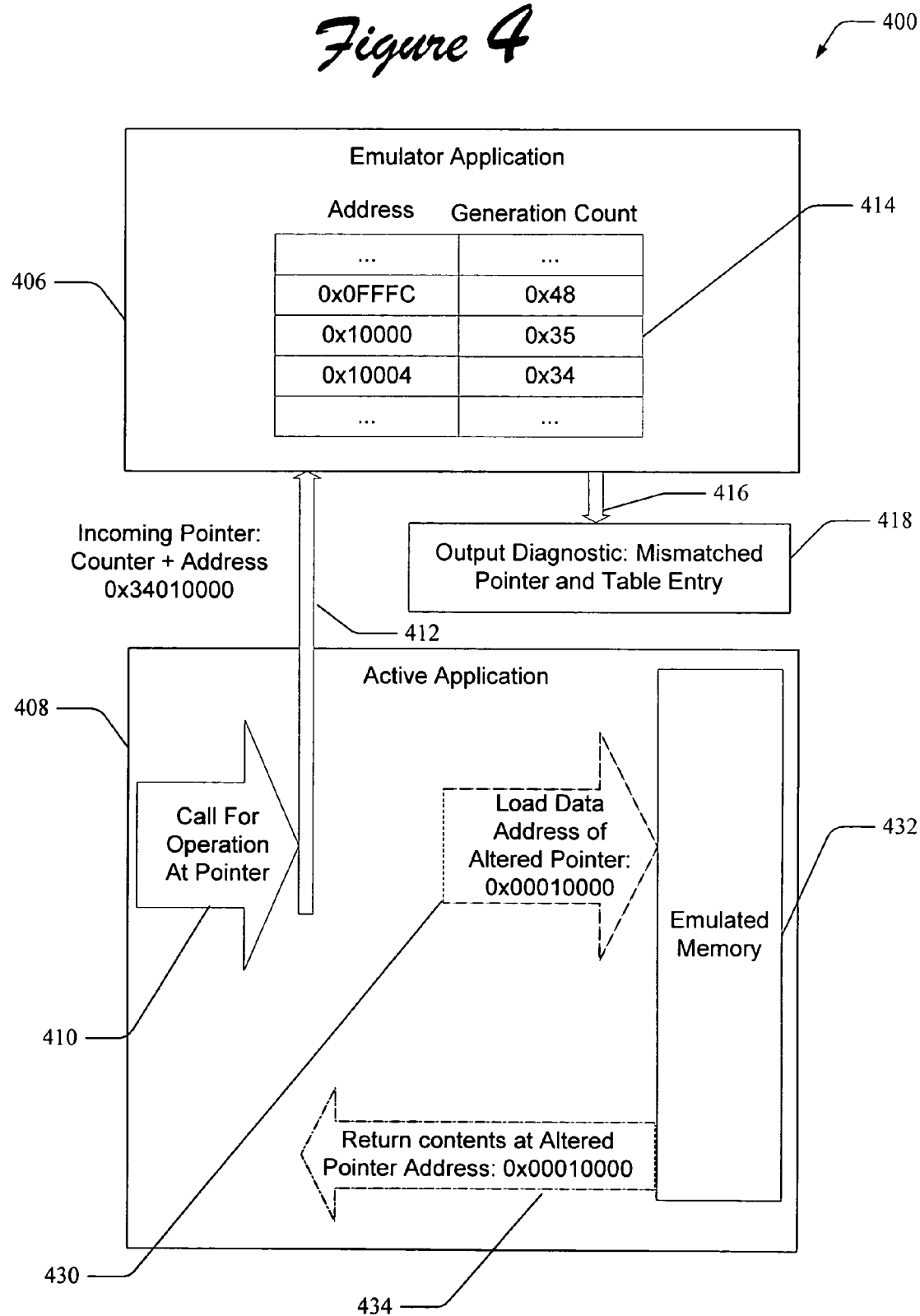
FIG. 4 is a flowchart for an implementation of an exemplary process for emulated memory management for an application running in an emulator that attempts an access to emulated memory to read a previously freed heap block of emulated memory while using a stale pointer, where a comparison between two identifiers is made for the heap block of emulated memory, and where the comparison finds and prevents the incorrect access to emulated memory.

FIG. 4 depicts still another implementation in which a computing device executes an emulator application 406. The execution of the emulator application 406 in turn emulates the execution of a central processing unit (CPU) of a low resource client. The emulated CPU in the low resource client executes an active application 408. A call 410 is made by the active application 408 for an emulated memory access operation to be made. The emulated memory access operation requested by active application 408 is for the return of the contents that is stored at the address of '0x3401000' in an incoming pointer. The incoming pointer can be contained in a communication 412 that is made to the emulator application 406. The contents '0x34010000' of the incoming pointer that is processed by the emulator application 406 includes the generation count '0x34' and the address '0x10000'. The generation count contained in the incoming pointer is compared for the address '0x10000' with the corresponding table entry 414. Here, a match is not found because the generation count '0x35' in table entry 414 for address '0x10000' conflicts with the generation count '0x34' in the incoming pointer. As such, a communication 416 results in the output 418 of a diagnostic. The diagnostic represents the condition of an incorrect access to emulated memory 432 that has occurred as determined by a mismatch between the incoming pointer and the table entry of the corresponding address in emulated memory 432.

But for the mismatching of the generation count between the incoming pointer and the table entry for the corresponding address, the emulated memory access operation would have been permitted to continue to accomplish the requested return 434 of the contents of emulated memory 432 located at the address '0x00010000' as represented by the altered pointer. Note that the generation count is removed in the altered pointer that is used by the active application 408 in this emulated memory access operation.

FIGS. 1-4 demonstrate exemplary implementations in which a first software program can be executed by a computing device so as to emulate the environment necessary to allow execution of a second software program using emulated memory. The first software program has instructions that permit the second software program to perform an operation on a portion of the emulated memory only when a pointer thereto and a table entry referencing that portion both contain the same ID or generation count. The reference of the pointer is the address to that portion and the table entry maps to that portion, where a plurality of such table entries map to respective portions of the emulated memory.

In some implementations, the first software program removes the ID or generation count from the corresponding pointer when it is processed by the execution of the second software program. The first software program may also identically change the ID or generation count within both of the corresponding pointer and the table entry after the execution of the second software program has performed an operation on the portion of the emulated memory that warrants the change, as discussed above.

In some implementations, the first software program can be executed by a first apparatus such as a personal computer. The execution of the first software program in turn emulates a second apparatus executing the second software program. The second apparatus, can be a high resource computing device, such as a Personal Computer (PC), a workstation, or a server. The second apparatus can also be a low resource client such as a set top box, a video game console, a Personal Digital Assistant (PDA), a cellular telephone, a handheld computing device, or a client having less memory and/or computing resources than that of the first apparatus.

A Computer System

Figure 5:
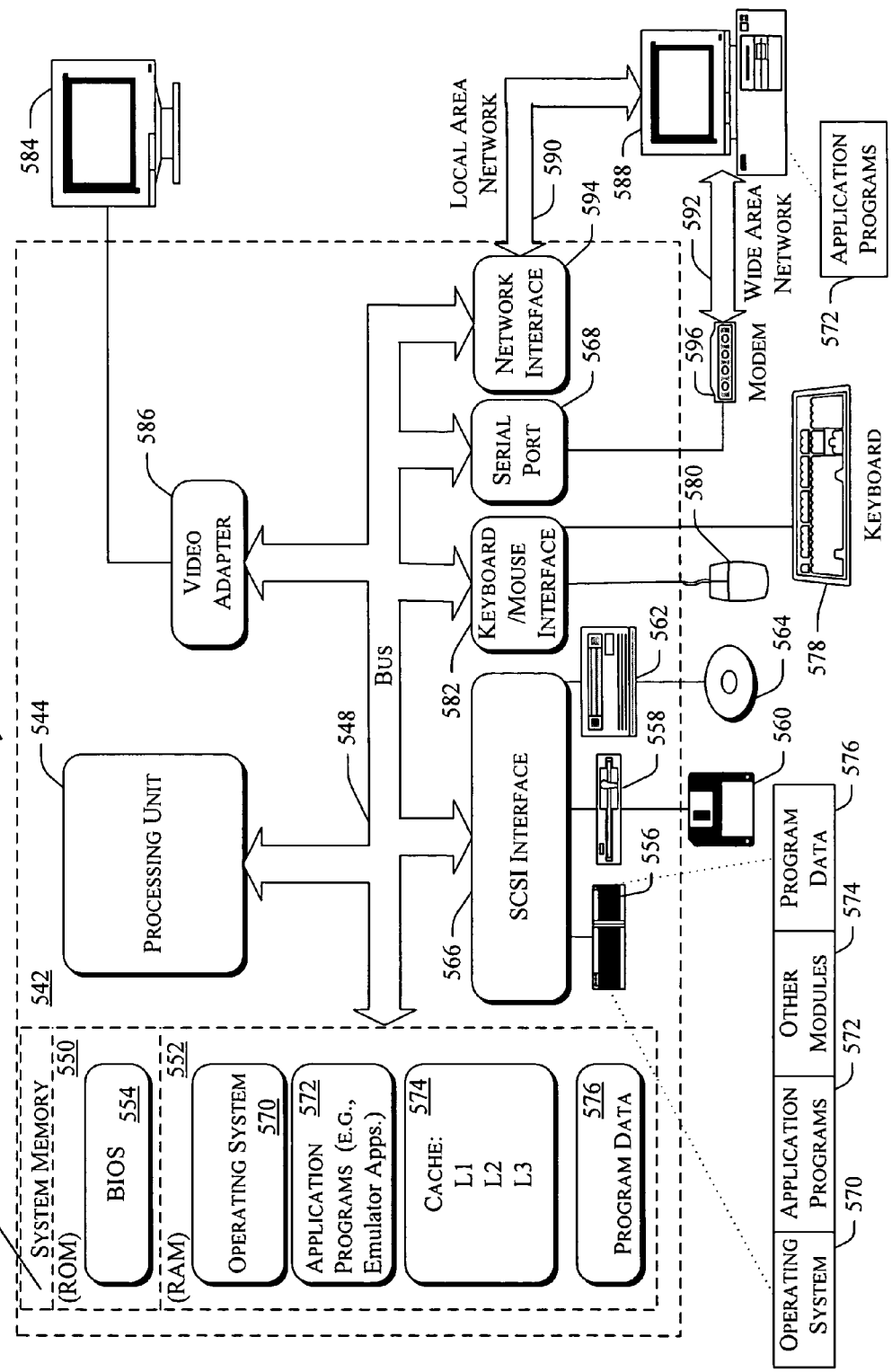
FIG. 5 is a block diagram of an exemplary environment capable of supporting the computing device of FIG. 1.

FIG. 5 shows an exemplary computer system that can be used to implement the processes described herein. Computer 542 includes one or more processors or processing units 544, a system memory 546, and a bus 548 that couples various system components including the system memory 546 to processors 544. The bus 548 represents one or more of any of several types of bus structures, including a memory bus or memory controller, a peripheral bus, an accelerated graphics port, and a processor or local bus using any of a variety of bus architectures. The system memory 546 includes read only memory (ROM) 550 and random access memory (RAM) 552. A basic input/output system (BIOS) 554, containing the basic routines that help to transfer information between elements within computer 542, such as during start-up, is stored in ROM 550.

Computer 542 further includes a hard disk drive 556 for reading from and writing to a hard disk (not shown), a magnetic disk drive 558 for reading from and writing to a removable magnetic disk 560, and an optical disk drive 562 for reading from or writing to a removable optical disk 564 such as a CD ROM or other optical media. The hard disk drive 556, magnetic disk drive 558, and optical disk drive 562 are connected to the bus 548 by an SCSI interface 566 or some other appropriate interface. The drives and their associated computer-readable media provide nonvolatile storage of computer-readable instructions, data structures, program modules and other data for computer 542. Although the exemplary environment described herein employs a hard disk, a removable magnetic disk 560 and a removable optical disk 564, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 556, magnetic disk 560, optical disk 564, ROM 550, or RAM 552, including an operating system 570, one or more application programs 572 (such as the emulator applications 126), cache/other modules 574, and program data 576. A user may enter commands and information into computer 542 through input devices such as a keyboard 578 and a pointing device 580. Other input devices (not shown) may include a microphone, joystick, game pad, satellite dish, scanner, or the like. These and other input devices are connected to the processing unit 544 through an interface 582 that is coupled to the bus 548. A monitor 584 or other type of display device is also connected to the bus 548 via an interface, such as a video adapter 586. In addition to the monitor, personal computers typically include other peripheral output devices (not shown) such as speakers and printers.

Computer 542 commonly operates in a networked environment using logical connections to one or more remote computers, such as a remote computer 588. The remote computer 588 may be another personal computer, a server, a router, a network PC, a peer device or other common network node, and typically includes many or all of the elements described above relative to computer 542. The logical connections depicted in FIG. 5 include a local area network (LAN) 590 and a wide area network (WAN) 592. Such networking environments are commonplace in offices, enterprise-wide computer networks, intranets, and the Internet.

When used in a LAN networking environment, computer 542 is connected to the local network through a network interface or adapter 594. When used in a WAN networking environment, computer 542 typically includes a modem 596 or other means for establishing communications over the wide area network 592, such as the Internet. The modem 596, which may be internal or external, is connected to the bus 548 via a serial port interface 568. In a networked environment, program modules depicted relative to the personal computer 542, or portions thereof, may be stored in the remote memory storage device. It will be appreciated that the network connections shown are exemplary and other means of establishing a communications link between the computers may be used.

Generally, the data processors of computer 542 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of emulating memory management of a low resource computing device with an emulator application running on a high resource computing device, the method comprising:

allocating one or more contiguous portions of emulated memory on the high resource computing device, wherein each contiguous portion has an address;

assigning an identifier to each address, wherein the identifier is assigned by a memory manager associated with the emulator application;

entering each identifier into a table, wherein each identifier is mapped to its corresponding address;

producing one or more pointers, wherein each of the one or more pointers includes an identifier and points to an address corresponding to the identifier; and emulating a memory access operation, wherein the emulating comprises:

attempting to access a contiguous portion of the emulated memory having a first address;

comparing a first identifier in a pointer associated with the first address with a second identifier included in the table, the second identifier being mapped to the first address, and accessing the contiguous portion of emulated memory associated with the first address when the first and second identifiers are the same.

2. The method as defined in claim 1, wherein the entering is performed by the memory manager associated with the emulator application.

3. The method as defined in claim 1, further comprising outputting a diagnostic when the first and second identifiers are not the same.

4. The method as defined in claim 1, wherein the low resource computing device is selected from the group consisting of:

a personal computer (PC);
a workstation;
a server;
a set top box;
a video game console;
a Personal Digital Assistant (PDA);
a cellular telephone;
a handheld computing device; and
a computing device having less memory and/or computing resources than that of another computing device executing the emulator application.

5. A computer-readable medium comprising instructions that, when executed by a computer, performs the method of claim 1.

6. A method for emulating at least some of the operational characteristics of a low resource computing device using resources of a high resource computing device comprising:

making a call to a memory manager for an emulated memory access operation to an allocated contiguous portion of emulated memory, wherein a generation count has been assigned by the memory manager for the emulated memory access operation to:
  a plurality of table entries corresponding to a respective plurality of said allocated contiguous portions of emulated memory, and
  a plurality of pointers each including an address to a respective said allocated contiguous portion of emulated memory;
comparing the generation count:
  in the pointer including the address to the allocated contiguous portion of emulated memory; and
  in the table entry corresponding to the allocated contiguous portion of emulated memory;
if the respective said generation counts in the comparison do not match, then outputting a diagnostic; and
if the respective said generation counts in the comparison match, removing the generation count from the pointer specified by the memory manager for the emulated memory access operation during the performing of the emulated memory access operation for which the memory manager was called.

7. The method as defined in claim 6, further comprising:
performing the emulated memory access operation for which the memory manager was called when there is a match of the respective said generation counts; and
preventing the performance of the emulated memory access operation for which the memory manager was called when the respective said generation counts of the comparison do not match.

8. The method as defined in claim 7, further comprising, when there is a match and the emulated memory access operation is not a read or a write operation, incrementing the generation count in both:
  the pointer including the address to the allocated contiguous portion of emulated memory; and
  the table entry corresponding to the allocated contiguous portion of emulated memory.

9. The method as defined in claim 6, wherein the emulated memory access operation is selected from the group consisting of:
  a read operation;
  a write operation;
  a reallocation operation; and
  an operation to free one or more of said allocated contiguous portions of emulated memory.

10. The method as defined in claim 6, further comprising, prior to the making of the call:
  making a call to the memory manager for to allocate a contiguous portion of emulated memory;
  receiving one said pointer from the memory manager that includes the address of the allocated contiguous portion of emulated memory;
  performing the allocation of the contiguous portion of emulated memory; and
  inserting the generation count:
    in the:
      the pointer including the address to the one said allocated contiguous portion of emulated memory; and
      the plurality of table entries corresponding to the one said allocated contiguous portion of emulated memory.

11. In a first computing device executing a first application for the emulation of a second computing device executing a second application, a method comprising:
making a call from the second application to a memory manager for an emulated memory access operation to an allocated contiguous portion of emulated memory used by the second application and including a plurality of said allocated contiguous portions, wherein:
  a generation count is in a plurality of table entries corresponding to a respective plurality of said allocated contiguous portions of emulated memory, the generation count being entered into the plurality of table entries by the first application;
  a generation count is in a plurality of pointers each including an address to a respective said allocated contiguous portion of emulated memory, the generation count being included in the plurality of pointers by the first application;
  for the emulated memory access operation, the memory manager uses the address in the pointer that corresponds to the allocated contiguous portion in emulated memory after removal of the generation count from the pointer; and
prior to performing the emulated memory access operation to the allocated contiguous portion of emulated memory:
  comparing the generation count:
    in the pointer including the address of the allocated contiguous portion of the emulated memory; and
    in the table entry corresponding to the allocated contiguous portion of the emulated memory;
  outputting a diagnostic when the respective said generation counts of the comparison do not match.

12. The method as defined in claim 11, further comprising:
performing the emulated memory access operation for which the memory manager was called when there is a match of the respective said generation counts; and
preventing the performance of the emulated memory access operation for which the memory manager was called when the respective said generation counts of the comparison do not match.

13. The method as defined in claim 12 further comprising, when there is a match of the respective said generation counts and the emulated memory access operation is not a read operation or a write operation, incrementing the generation count in both:
  the pointer including the address to the allocated contiguous portion of emulated memory; and
  the table entry corresponding to the allocated contiguous portion of emulated memory.

14. The method as defined in claim 11, further comprising, when:
  the comparison finds that there is a match of the respective said generation counts; and
  the emulated memory access operation is neither a read operation nor a write operation:
    performing the emulated memory access operation for which the memory manager was called and during which the generation count is removed from the pointer used by the memory manager.

15. The method as defined in claim 11, wherein the emulated memory access operation is selected from the group consisting of:
  a read operation;
  a write operation;
  a reallocation operation; and
  an operation to free one or more of said allocated contiguous portions of emulated memory.

16. The method as defined in claim 11, further comprising, prior to the making of the call by the second application to the memory manager for the emulated memory access operation:
  making a call by the second application to the memory manager for an allocation of said allocated contiguous portion of emulated memory;
  receiving one said pointer from the memory manager that includes an address to said allocated contiguous portion of emulated memory;
  performing an allocation of said allocated contiguous portions of emulated memory; and
  incrementing the generation count in both:
    the pointer including the address to said allocated contiguous portion of emulated memory; and
    the table entry corresponding to said allocated contiguous portion of emulated memory.

17. The method as defined in claim 11, wherein the second computing device is selected from the group consisting of:
  a PC;
  a workstation;
  a server;
  a set top box;
  a video game console;
  a PDA;
  a cellular telephone;
  a handheld computing device;
  a consumer electronic device having a processor and memory; and
  a client having less memory and/or computing resources than that of the first computing device.

18. A computer-readable medium comprising instructions that, when executed by a computer, performs the method of claim 11.

19. A computer-readable medium including instructions for execution by a computer, wherein the instructions comprise:
  first logic calling for an emulated memory access operation with respect to a first of a contiguous portion of an emulated memory for which there is:
    a corresponding table entry in a table having a plurality of said table entries that map to respective other said portions of the emulated memory, wherein each said table entry includes an identifier, and further wherein each identifier is entered into its corresponding table entry by an emulator application; and
    a corresponding pointer to a plurality of pointers each including an identifier and an address to a respective said contiguous portion of the emulated memory, wherein each identifier is entered into its corresponding pointer by the emulator application;
  second logic, in response to the first logic, such that, if the identifier in the table entry corresponding to the first said contiguous portion is the same as the identifier in the pointer corresponding to the first said portion, then:
    the emulated memory access operation is performed with respect to the first said contiguous portion of the emulated memory.

20. The computer-readable medium as defined in claim 19, wherein the emulated memory access operation is selected from the group consisting of:
  a read operation;
  a write operation;
  a reallocation operation; and
  an operation to free one or more of said portions of the emulated memory.

21. The computer-readable medium as defined in claim 19, wherein the performance of the memory operation further comprises removing the identifier from the pointer corresponding to the first said contiguous portion during the performance of the memory operation.

22. The computer-readable medium as defined in claim 19, wherein the second logic is further configured to identically change the identifier in both the table entry corresponding to the first said portion and the pointer corresponding to the first said portion when the emulated memory access operation is neither a read operation nor a write operation.

* * * * *

UNITED STATES PATENT AND TRADEMARK OFFICE
CERTIFICATE OF CORRECTION

| | | |
|---|---|---|
| PATENT NO. | : 7,403,887 B1 | Page 1 of 1 |
| APPLICATION NO. | : 10/759773 | |
| DATED | : July 22, 2008 | |
| INVENTOR(S) | : Alan G. Bishop et al. | |

It is certified that error appears in the above-identified patent and that said Letters Patent is hereby corrected as shown below:

In column 5, line 50, delete "0)" and insert -- (j) --, therefor.

Signed and Sealed this
Third Day of May, 2011

David J. Kappos
*Director of the United States Patent and Trademark Office*